United States Patent
Schindler et al.

(10) Patent No.: US 11,938,671 B2
(45) Date of Patent: Mar. 26, 2024

(54) METHOD AND DEVICE FOR PRODUCING AT LEAST ONE PLA STRIP

(71) Applicant: STC SPINNZWIRN GMBH, Chemnitz (DE)

(72) Inventors: Kenneth Schindler, Chemnitz (DE); Bert Woellner, Oberlungwitz (DE); Daniel Götze, Chemnitz (DE); Torsten Müller, Chemnitz (DE); Jens Weinhold, Chemnitz (DE)

(73) Assignee: STC Spinnzwirn GmbH, Chemnitz (DE)

( * ) Notice: Subject to any disclaimer, the term of this patent is extended or adjusted under 35 U.S.C. 154(b) by 21 days.

(21) Appl. No.: 17/633,689

(22) PCT Filed: Jul. 22, 2020

(86) PCT No.: PCT/EP2020/070634
§ 371 (c)(1),
(2) Date: Feb. 8, 2022

(87) PCT Pub. No.: WO2021/032395
PCT Pub. Date: Feb. 25, 2021

(65) Prior Publication Data
US 2022/0297372 A1   Sep. 22, 2022

(30) Foreign Application Priority Data
Aug. 20, 2019 (DE) ............ 10 2019 122 311.3

(51) Int. Cl.
*B29C 55/10* (2006.01)
*B29C 55/00* (2006.01)
*B29K 67/00* (2006.01)
*B29L 7/00* (2006.01)

(52) U.S. Cl.
CPC ............ *B29C 55/10* (2013.01); *B29C 55/005* (2013.01); *B29C 2793/0027* (2013.01); *B29C 2793/0036* (2013.01); *B29K 2067/046* (2013.01); *B29L 2007/007* (2013.01)

(58) Field of Classification Search
CPC .......... B29C 55/10; B29C 55/005; B29C 2793/0027; B29C 2793/0036; B29C 69/001; B29C 55/02; B29K 2067/046; B29L 2007/007; Y02W 90/10
See application file for complete search history.

(56) References Cited

U.S. PATENT DOCUMENTS

| 4,129,632 A * | 12/1978 | Olson .................. B29C 48/08 264/146 |
| 5,922,164 A * | 7/1999 | Kimura .................. C08J 5/18 428/35.8 |
| 7,128,969 B2 | 10/2006 | Busch et al. |

(Continued)

FOREIGN PATENT DOCUMENTS

WO   2010074576   7/2010

*Primary Examiner* — Jeffrey M Wollschlager
(74) *Attorney, Agent, or Firm* — BainwoodHuang

(57) ABSTRACT

Techniques for producing at least one PLA strip involve: a) providing a strip-shaped extruded PLA film, b) heating the PLA film provided according to step a) to a temperature in the range from 40 to 70° C., c) cutting the PLA film heated according to step b) into the at least one PLA strip, and d) stretching the PLA film cut according to step c).

6 Claims, 2 Drawing Sheets

(56) References Cited

U.S. PATENT DOCUMENTS

Figure 1:
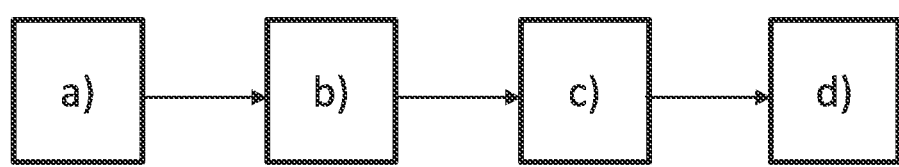

| | | | |
|---|---|---|---|
| 2011/0048187 A1* | 3/2011 | Uchiumi | B29C 55/08 |
| | | | 83/56 |
| 2011/0293877 A1* | 12/2011 | Wolters-Zuur | B29C 48/05 |
| | | | 428/97 |
| 2012/0107527 A1* | 5/2012 | Auffermann | D01D 5/426 |
| | | | 524/53 |
| 2015/0061198 A1* | 3/2015 | Velasquez | B29C 48/0018 |
| | | | 264/564 |
| 2016/0124126 A1* | 5/2016 | Vasylyev | G02B 5/003 |
| | | | 359/893 |
| 2017/0246656 A1* | 8/2017 | Allen | B65H 23/02 |
| 2019/0061279 A1* | 2/2019 | Hou | B32B 27/302 |

* cited by examiner

METHOD AND DEVICE FOR PRODUCING AT LEAST ONE PLA STRIP

The present invention relates to a process and an apparatus for producing at least one PLA tape.

Polylactides, also called PLA, are known from the prior art. Plastic manufactured from PLA can be used in a wide variety of different sectors. For example, packaging material such as films or containers can be manufactured from PLA. PLA has the advantage that it is biodegradable and can be produced from renewable raw materials. PLA is also suitable for the packaging of foodstuffs.

For certain applications it is known practice to use PLA tapes, these being PLA plastic in tape form. Examples thereof are agrotextiles and geotextiles such as protective fabric and harvesting twine, carpet backing and substitute jute. PLA tapes can be used in artificial lawns as well. Depending on application, PLA tapes may also be referred to as PLA filaments.

A problem associated with the production of PLA tapes in the prior art is that PLA is very difficult, or impossible, to bring into a desired form. The reason for this in particular is that PLA after extrusion is amorphous. Cut edges therefore tend not to be well and evenly formed. As a result of this, in subsequent production steps, tearing might occur. Sufficient strength and a stable operation are barely possible. For this reason, tapes known as monotapes have been developed. These are PLA tapes produced by specifying the breadth of the PLA tape right at the extrusion of a starting material. In this case there is what is called a "neck-in" effect. The effect thus described is that the breadth of a PLA tape may reduce after extrusion when the PLA is taken off and cooled. To obtain PLA tapes having a desired breadth, a considerable experimental effort must normally be made because of the neck-in effect. For each tape breadth, in particular, a dedicated extrusion die is required. It is often not enough merely to rescale a known die for a new tape breadth. The production of monotapes is therefore highly inflexible. In addition, PLA tapes produced in the form of monotapes may have a poorer quality in edge regions than in the other regions.

On this basis, it is an object of the present invention to overcome at least to some extent the problems known from the prior art, and more particularly to provide a process and an apparatus with which PLA tapes can be produced with flexible breadth in a simple way.

This object is achieved with features disclosed herein. Further advantageous embodiments of the invention are specified disclosed herein as well. The features individually can be combined with one another in a technological meaningful way and may define further embodiments of the invention. Furthermore, the features may be particularized and elucidated in the description, representing further preferred embodiments of the invention.

The invention presents a process for producing at least one PLA tape. The process comprises:
a) providing a tapelike extruded PLA film,
b) heating the PLA film provided in step a) to a temperature in the range from 40 to 70° C.,
c) slitting the PLA film heated in step b) into the at least one PLA tape, and
d) drawing the PLA film slit in step c).

With the process described, PLA may first be extruded in film form and subsequently slit. In contrast to known processes, it has emerged that a PLA film can be slit if the PLA film prior to the slitting is heated to a temperature in the range from 40 to 70° C., more particularly to a temperature above the glass transition temperature. With the process described it is possible accordingly to obtain PLA tapes by slitting of a PLA film.

The process described is used for producing at least one PLA tape. This means that with the process described, at a particular time, a single PLA tape or simultaneously two or more PLA tapes may be produced. A PLA tape refers to a filmlike piece of PLA plastic whose breadth is very much less than its length. A PLA tape differs from a tapelike PLA film in that a PLA tape has a lower breadth than the tapelike PLA film. The PLA tape in particular may be produced as a continuous tape and wound up. The process, accordingly, serves preferably for producing at least one continuous PLA tape. The process may be carried out with an apparatus by which the PLA film or the at least one PLA tape is guided, for example, by godets.

Because the process described allows a PLA film to be slit, the at least one PLA tape may be obtained with the process described by slitting of the PLA film. A single PLA tape may be obtained by means of the process described, for example, by the PLA tape being cut out from the PLA film, with the remaining parts of the PLA film being discarded. A plurality of PLA tapes may be obtained in particular by cutting up the PLA film into the PLA tapes with no remnants.

The process described is especially suitable for applications in agrotextiles and geotextiles such as protective fabric and harvesting twine, carpet backing and substitute jute. The process described may also be used for producing PLA tapes for artificial lawn, especially for sports grounds or for landscaping.

The process described encompasses steps a) to d), which are carried out preferably in the order stated. Steps b) and c) may also be carried out simultaneously in whole or in part. It is preferred for step b) to begin before step c). Step d) takes place preferably after conclusion of step c).

Step a) of the process described provides a tapelike extruded PLA film. In comparison to the PLA tapes, the PLA film has a similar tapelike form, but has a greater breadth than the PLA tapes. The PLA film may be provided more particularly by the provision of an existing tapelike extruded PLA film, produced outside of the process described, or by the extrusion production of the tapelike PLA film as a part of step a). Extrusion in this context means that a melted starting material, more particularly comprising pellets, is pressed through a die into a desired shape. The die is designed preferably as a die lip or a die plate.

In step b) the PLA film is heated to a temperature in the range from 40 to 70° C. This heat treatment enables the slitting of the PLA film.

The PLA is preferably heated to a temperature close to the glass transition temperature of the PLA. Heating takes place more preferably to a temperature above the glass transition temperature. The glass transition temperature of PLA is situated approximately between 45° C. and 65° C. Heating to 40 to 70° C. is therefore heating to a temperature in the range of the glass transition temperature. It is preferred for the glass transition temperature of the specific PLA used to be determined initially by tests and for the temperature for heating to be selected on the basis of the results obtained from the tests.

In step c) the PLA film is slit. This is accomplished preferably while the PLA film has a temperature in the range from 40 to 70° C., more particularly above the glass transition temperature. After the slitting the temperature can drop again.

In step c) at least one cut is made. It is preferable, however, for a plurality of cuts to be made.

The PLA film in step c) is slit in the longitudinal direction. This means that the at least one cut is made along the direction in which the PLA film extends in tape form. Where the PLA film for the process described is guided over godets through an apparatus, the at least one cut is made preferably along the direction of movement of the PLA film. One cut may therefore be made by a stationary blade; a plurality of parallel cuts may be produced by a plurality of stationary blades arranged next to one another.

The slitting produces the at least one PLA tape from the PLA film.

The at least one tape is subsequently drawn in step d).

Drawing may be accomplished, for example, by guiding the PLA tape or the PLA filaments over godets which rotate at different speeds. The drawing may increase the tensile strength of the PLA tapes.

According to one preferred form of implementation of the process, a breadth of the at least one PLA tape is changed between different sections of the process.

With the process described it is possible to adjust the breadth of the at least one PLA tape by way of the distance between the blades used for slitting. Such adjustment is possible at very much lower outlay than the replacement of the extrusion die in the production of monotapes. In particular, the breadth may be varied as desired without any need to construct a separate extrusion die for each breadth, at considerable outlay.

In the present form of implementation, this circumstance is utilized in order to produce PLA tapes in different breadths. Accordingly, in a first process section, PLA tapes of a first breadth may be produced, and in a second process section PLA tapes of a second breadth. The PLA tapes of the first breadth can be wound up separately from the PLA tapes of the second breadth and transported away as a product.

Where the process described is used to produced more than one PLA tape at the same time, the simultaneously produced PLA tapes may all have the same breadth or may have different breadths. In the present form of implementation, accordingly, PLA tapes having a first set of breadths may be produced in a first process section, and PLA tapes having a second set of breadths in a second process section.

According to a further preferred form of implementation of the process, edge regions of the PLA film are cut off in step c).

The edge regions of the PLA film are the outermost regions of the PLA film, viewed transversely to the direction in which the PLA film is formed as a tape. More particularly, the edge regions may be of poorer quality than the remaining part of the PLA film. This may be due, for example, to the above-described neck-in effect. The edge regions may be discarded or recycled.

The cutting-off of the edge regions of the PLA film in accordance with the present form of implementation is an advantage relative to the production of monotapes. In the case of monotapes, the poorer-quality edge regions are automatically part of the PLA tapes produced.

According to a further preferred form of implementation of the process, the PLA film is heated by means of at least one heated godet in step b).

With preference in particular the shell of the at least one heated godet is heated. Through contact with the godet shell, the PLA film can be simply and quickly heated to a precisely adjustable temperature.

According to a further preferred form of implementation of the process, the tensile stress is generated by guiding the PLA film over two godets which are driven at speeds different from one another by a factor in the range from 1.01 to 1.05.

The tensile stress may be generated by guiding the PLA film over two godets which are driven at different speeds. Of the two godets, the one which is in front in the transport direction of the PLA film is faster than the other godet, and this produces the tensile stress. Blades for slitting the PLA film are preferably arranged between the two godets. In that case the slower of the two godets is arranged upstream of the blades, the faster of the two godets downstream of the blades.

It has emerged that the heated PLA film can be slit particularly well if the speeds of the two godets are different from one another by a factor in the range from 1.01 to 1.05. This means that the faster of the two godets is faster by a factor of 1.01 to 1.05 than the slower of the two godets.

The tensile stress used during slitting is preferably sufficiently slight not to cause as yet any drawing of the PLA film in the sense of step d).

According to a preferred form of implementation of the process, a first of the godets is also utilized for heating the PLA film in step b).

The present form of implementation is preferred in combination with the form of implementation in which the PLA film in step b) is heated by means of at least one heated godet.

In this embodiment, the at least one heated godet also serves to generate the tensile stress. The process described can accordingly be carried out with a particularly efficiently designed apparatus.

Presented as a further aspect of the invention is an apparatus for producing at least one PLA tape. The apparatus comprises:
 a heating device for heating a tapelike extruded PLA film,
 a slitting device for slitting the PLA film heated by means of the heating device into the at least one PLA tape,
 a control unit which is configured to control the heating device in such a way that the PLA film is heated by the heating device to a temperature in the range from 40 to 70° C.,
 a drawing device downstream of the slitting device.

The particular advantages and embodiment features described for the process are applicable and transposable to the apparatus, and vice versa. The process described in particular is performed preferably with the apparatus described. The apparatus described in particular is configured preferably to carry out the process described.

The apparatus preferably comprises a plurality of godets. One function of the godets is to transport the PLA film or the at least one PLA tape. At least one of the godets, preferably, is a heated godet, and consequently this godet also serves for the heating of the PLA film. The heating device is preferably formed by at least one heated godet. Moreover, certain of the godets may serve for generating a tensile stress in the PLA film and/or may bring about drawing of the PLA tapes.

The slitting device is arranged downstream of the heating device. This means that, in regular operation of the apparatus, the PLA film passes through the heating device before the slitting device. It is nevertheless also preferable for heating to continue during slitting, and so an overlap between slitting device and heating device is possible.

The apparatus further comprises a drawing device for drawing the PLA film slit by means of the slitting device. The drawing device is arranged downstream of the slitting device. This means that, in regular operation of the apparatus, the PLA film passes through the slitting device before the drawing device.

According to one preferred form of implementation of the apparatus, the slitting device comprises a plurality of blades for slitting the PLA film.

The blades may be in a stationary arrangement. In that case, the PLA film may be slit by the blades by virtue of the PLA film running past the blades.

According to a further preferred form of implementation of the apparatus, the slitting device is designed in such a way that a variable number of the blades can be used for slitting the PLA film and/or that the blades can be used at a variable distance from one another for slitting the PLA film.

The slitting device is preferably designed in such a way that a variable number of the blades can be used for slitting the PLA film and that the blades can be used at a variable distance from one another for slitting the PLA film.

Figure 2:
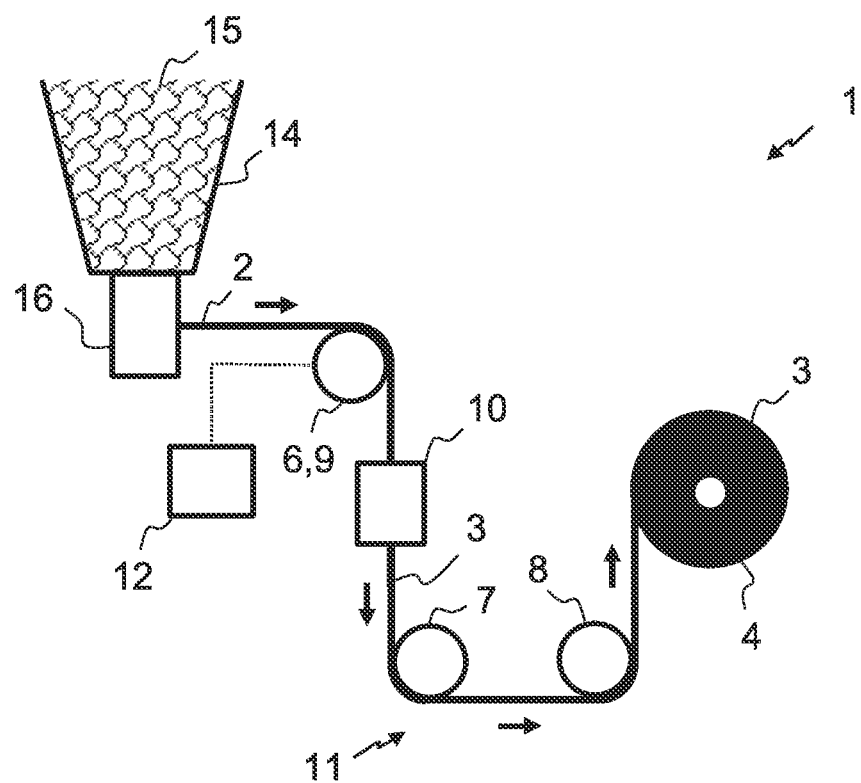
Figure 3:
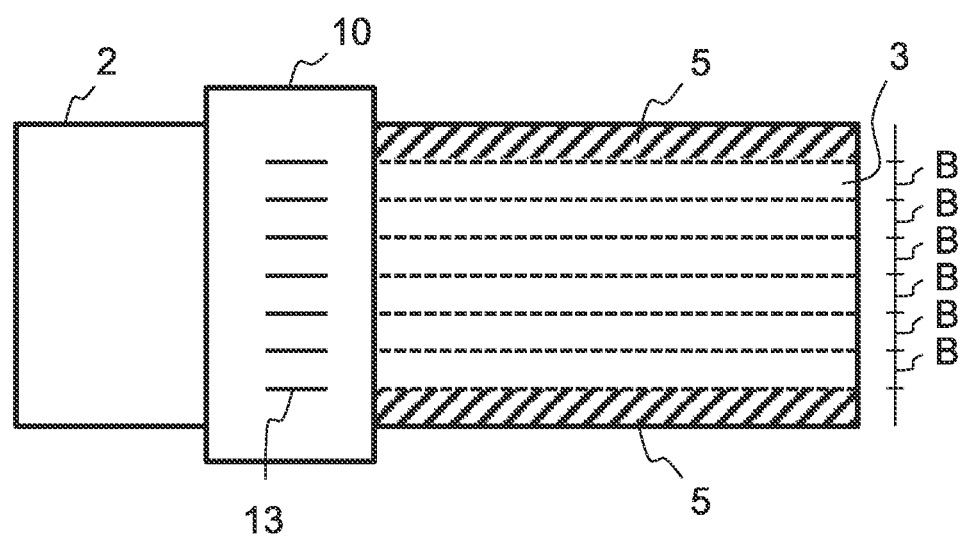

The invention and also the technical environment are elucidated in more detail below with reference to the figures. It should be noted that there is no intention to restrict the invention by the exemplary embodiments shown. In particular, unless explicitly stated otherwise, it is also possible for partial aspects of the content elucidated in the figures to be extracted and combined with other constituents and insights from the present description and/or figures. It should be noted in particular that the figures, and especially the proportions shown, are only schematic. Identical reference symbols denote identical objects, and so explanations from other figures may be employed as a supplement where appropriate. In the drawings:

FIG. 1 shows a schematic order of a process of the invention for producing at least one PLA tape, FIG. 2 shows a schematic side view of an apparatus of the invention for producing at least one PLA tape by the process according to FIG. 1, and FIG. 3 shows a schematic plan view of part of the apparatus from FIG. 2.

FIG. 1 shows a schematic order of a process of the invention for producing at least one PLA tape 3. The reference symbols relate to FIGS. 2 and 3. The process comprises:
- a) providing a tapelike extruded PLA film 2,
- b) heating the PLA film 2 provided in step a) by means of at least one heated godet 6 to a temperature in the range from 40 to 70° C.,
- c) slitting the PLA film 2 heated in step b) into a plurality of PLA tapes 3. In this procedure, edge regions 5 of the PLA film 2 are cut off. A breadth B of the PLA tapes 3 is changed between different sections of the process. The PLA film 2 is held under a tensile stress during slitting. For that purpose the PLA film 2 is guided over two godets 6, 7, which are driven at speeds which are different from one another by a factor in the range from 1.01 to 1.05. A first of the godets 6 is heated and is also utilized for heating the PLA film 2 in step b).
- d) drawing the PLA film 2 slit in step c).

FIG. 2 shows a schematic side view of an apparatus 1 of the invention for producing at least one PLA tape 3. The apparatus 1 is configured to carry out the process from FIG. 1. The apparatus 1 can be used to produce a plurality of PLA tapes 3 from a PLA film 2. The apparatus 1 is shown together with the PLA tapes 3 and the PLA film 2, which are not part of the apparatus 1. First of all, a tapelike PLA film 2 is produced by extrusion. The starting material for this film comprises pellets 15, which are held in a hopper 14 of the apparatus 1 and can be supplied from there to an extrusion device 16 of the apparatus 1. The PLA film 2 was formed from the pellets 15 by extrusion in the extrusion device 16. Leaving the extrusion device 2, the PLA film 2, as indicated by arrows, is guided over godets 6, 7 and 8 and in this procedure is processed to form the PLA tapes 3, which are lastly wound up as the completed product onto a product spool 4.

In step b) of the process from FIG. 1, the PLA film 2 is first heated. For this purpose the apparatus 1 comprises a heating device 9. In the embodiment shown, the heating device 9 is formed by a first godet 6, which is heated. For this purpose the apparatus 1 comprises a control unit 12, which is configured to control the heating device 9 in such a way that the PLA film 2 is heated by the heating device 9 to a PLA temperature in the range from 40 to 70° C. The PLA film 2 is subsequently slit in step b). For this purpose the apparatus 1 comprises a slitting device 10. After the slitting, the PLA film 2 takes the form of the PLA tapes 3. These are drawn by means of a drawing device 11. The drawing device 11 is formed by a second godet 7 and a third godet 8, which are rotated at different speeds. The slitting device 10 is arranged downstream of the heating device 9. The drawing device 11 is arranged downstream of the slitting device 10.

FIG. 3 shows a schematic plan view of a part of the apparatus 1 from FIG. 2 together with the PLA film 2 and PLA tapes 3. It is apparent in particular that the PLA film 2 is slit by the slitting device 10 into PLA tapes 3 and that edge regions 5 of the PLA film are cut off by the slitting device 10. It is also apparent that the slitting device 10 comprises a plurality of blades 13 for slitting the PLA film 2 into PLA tapes 3. The design of the slitting device 10 is such that a variable number of the blades 13 can be used for slitting the PLA film 2 and that the blades 13 can be used at a variable distance from one another for slitting the PLA film 2.

LIST OF REFERENCE SYMBOLS 1 apparatus
2 PLA film
3 PLA tape
4 product spool
5 edge regions
6 first godet
7 second godet
8 third godet
9 heating device
10 slitting device
11 drawing device
12 control unit
13 blade
14 hopper
15 pellets
16 extrusion device
B breadth

The invention claimed is:

1. A process for producing at least one polylactide (PLA) tape, comprising:
   a) providing a tape-shaped extruded PLA film,
   b) heating the PLA film provided in step a) to a temperature in the range from 40 to 70° C. by means of at least one heated godet,
   c) slitting the PLA film heated in step b) into the at least one PLA tape, and
   d) drawing the at least one PLA tape slit in step c).

2. The process as claimed in claim 1, wherein heating in step b) takes place to a temperature above the glass transition temperature of the PLA.

3. The process as claimed in claim 1, wherein a breadth (B) of the at least one PLA tape is changed between different sections of the process.

4. The process as claimed in claim 1, wherein edge regions of the PLA film are cut off in step c).

5. The process as claimed in claim 1, wherein a tensile stress of the PLA film is generated by guiding the PLA film over two godets which are driven at speeds different from one another by a factor in the range from 1.01 to 1.05.

6. The process as claimed in claim 5, wherein a first of the godets is also utilized for heating the PLA film in step b).

* * * * *